United States Patent
Frank et al.

(10) Patent No.: US 7,822,806 B2
(45) Date of Patent: Oct. 26, 2010

(54) REAL-TIME DATA INTERFACE AND METHOD FOR BROWSERS AND THE LIKE

(75) Inventors: Brian Spencer Frank, Richmond, VA (US); John W. Sublett, Richmond, VA (US)

(73) Assignee: Honeywell International Inc., Morristown, NJ (US)

( * ) Notice: Subject to any disclaimer, the term of this patent is extended or adjusted under 35 U.S.C. 154(b) by 1025 days.

(21) Appl. No.: 10/485,848

(22) PCT Filed: Feb. 18, 2003

(86) PCT No.: PCT/US03/04804

§ 371 (c)(1), (2), (4) Date: Feb. 2, 2004

(87) PCT Pub. No.: WO03/071442

PCT Pub. Date: Aug. 28, 2003

(65) Prior Publication Data

US 2004/0215740 A1    Oct. 28, 2004

Related U.S. Application Data

(60) Provisional application No. 60/357,329, filed on Feb. 15, 2002.

(51) Int. Cl.
*G06F 15/16* (2006.01)
(52) U.S. Cl. .................. 709/203; 709/218; 709/219; 709/228; 709/246
(58) Field of Classification Search ......... 709/202–203, 709/206–207, 217, 219, 245, 218, 228, 246; 719/332
See application file for complete search history.

(56) References Cited

U.S. PATENT DOCUMENTS 4,435,764 A    3/1984    El-Gohary (Continued)

FOREIGN PATENT DOCUMENTS

| FR | 2812501 A1 | 2/2001 |
| WO | WO-01/90884 A2 | 11/2001 |
| WO | WO-03/071444 A1 | 8/2003 |

OTHER PUBLICATIONS

The Design and Evolution of C++, Bjarne Stroustrup, pp. 72-78, Mar. 9, 1994.
Interant Agents for Mobile Computing, D. chess et al, IBM Oct. 1995, pp. 34-49.

(Continued)

*Primary Examiner*—Quang N. Nguyen
(74) *Attorney, Agent, or Firm*—Schwegman, Lundberg, & Woessner P.A.

(57) ABSTRACT

Systems and methods provide a real-time data display and interface for a network device by loading a page in a browser (115), the page including an engine which is executed in the browser (120) and used to automatically load a definition file (125) from a remote source in response to content within the page. Widgets are instantiated for display in the interface, each making data requests (145) at intervals which are forwarded to one or more servers in communication with the network device. Requested data is received (160) and presented in the interface there by providing the user with dynamically updated data (165). An engine for driving such display comprises executable code configured to instantiate one or more widgets for rendering within the display of the real-time data interface. The engine further includes a reference to a definition file which defines prescribed parameters for one or more of the widgets.

19 Claims, 3 Drawing Sheets

U.S. PATENT DOCUMENTS

| | | | |
|---|---|---|---|
| 4,635,195 | A | 1/1987 | Jeppesen, III et al. |
| 4,677,566 | A | 6/1987 | Whittaker et al. |
| 4,747,041 | A | 5/1988 | Engel et al. |
| 4,935,863 | A | 6/1990 | Calvas et al. |
| 4,941,084 | A | 7/1990 | Terada et al. |
| 5,175,852 | A | 12/1992 | Johnson et al. |
| 5,511,188 | A | 4/1996 | Pascucci et al. |
| 5,522,044 | A | 5/1996 | Pascucci et al. |
| 5,550,980 | A | 8/1996 | Pascucci et al. |
| 5,598,566 | A | 1/1997 | Pascucci et al. |
| 5,608,870 | A * | 3/1997 | Valiant ................... 711/100 |
| 5,786,993 | A | 7/1998 | Frutiger et al. |
| 5,862,052 | A | 1/1999 | Nixon et al. |
| 5,916,306 | A | 6/1999 | Ruiz |
| 5,918,233 | A | 6/1999 | La Chance et al. |
| 5,982,362 | A | 11/1999 | Crater et al. |
| 6,012,071 | A * | 1/2000 | Krishna et al. ............ 709/217 |
| 6,028,988 | A | 2/2000 | Asaka et al. |
| 6,028,998 | A | 2/2000 | Gloudeman et al. |
| 6,047,222 | A | 4/2000 | Burns et al. |
| 6,055,562 | A | 4/2000 | Devarakonda et al. |
| 6,067,477 | A | 5/2000 | Wewalaarachchi et al. |
| 6,119,125 | A | 9/2000 | Gloudeman et al. |
| 6,157,943 | A * | 12/2000 | Meyer ..................... 709/203 |
| 6,185,566 | B1 | 2/2001 | Adams et al. |
| 6,189,109 | B1 | 2/2001 | Sheikh et al. |
| 6,353,853 | B1 | 3/2002 | Gravin |
| 6,356,920 | B1 | 3/2002 | Vandersluis |
| 6,370,448 | B1 | 4/2002 | Eryurek |
| 6,429,880 | B2 * | 8/2002 | Marcos et al. ............ 719/332 |
| 6,591,305 | B2 * | 7/2003 | Densmore ................. 709/245 |
| 6,636,885 | B1 * | 10/2003 | Martin ..................... 709/202 |
| 6,681,243 | B1 | 1/2004 | Putzolu et al. |
| 6,728,960 | B1 * | 4/2004 | Loomans .................. 709/206 |
| 6,754,691 | B1 | 6/2004 | Gomi et al. |
| 6,842,906 | B1 | 1/2005 | Bowman-Amuah |
| 6,868,441 | B2 | 3/2005 | Greene et al. |
| 6,886,158 | B2 | 4/2005 | Kitayama et al. |
| 7,010,503 | B1 * | 3/2006 | Oliver et al. .............. 709/219 |
| 7,039,624 | B1 * | 5/2006 | Merk et al. ............... 709/207 |
| 7,080,159 | B2 | 7/2006 | Chu et al. |
| 2002/0059583 | A1 | 5/2002 | Kim |
| 2002/0080945 | A1 | 6/2002 | Rojas |
| 2002/0114276 | A1 | 8/2002 | Basturk |
| 2003/0221162 | A1 | 11/2003 | Sridhar |

OTHER PUBLICATIONS

Java Aglet Application Programming Interface (J-AAPI) White Paper—Draft 2, IBM Tokyo, Feb. 19, 1997, 6 pages.
Aglet Specification 1.1 Draft, Mitsuru Oshima et al, Sep. 8, 1998, 45 pages.
Aglet Software Docuemtnation Kit, IBM, printed Jan. 13, 2000, 2 pages.
MAP: Design and Implementation of a Mobile Agent Platform, Antonio Puliafita et al, pp. 1-27, 2000.
Aglet Specification 1.0, Mitsuru Oshima et al, May 200, 1997, 33 pages.
Migrating to WML with GUI Extensions and XHTML Mobile Profile, Openwave, Nov. 2001, 11 pages.
WML Langauge Reference, Openwave 12 pages, printed Jan. 25, 2002.
Openwave Developer Program, Printed Jan. 25, 2002, 5 pages.
WML overview, Paul Adams, Webmonkey, 6 pages, printed Jan. 25, 2002.
Intro to HDML, Paul Adams, Webmonkey, 6 pages, printed Jan. 25, 2002.
"run-Time Programing Method for Reconfigurable Computer", Steve Cassselman, Virtual computer Corporation, 9 pages, Oct. 20, 1997.
Linker & Loaders, John R. Levine, Oct. 11, 1999, pp. 117-130.
International Preliminary Examination Report in connection with International Appl. No. PCT/US03/04803.
Thomas, Dave et al., Programming Ruby: The Pragmatic Programmer's Guide, Chapter 24, "Classes and Objects", pp. 379-392.
"Proceedings of the 1996 Pacific Workshop on Distributed Multimedia Systems," Jun. 27-28, 1996, Department of Information and Systems Management, Hong Kong Kong University of Science and Technology, Clear Water Bay, Kowloon, Hong Kong.
Akio Orihara et al., "An Autonomous Decentralized System Platform Under Multi-vendor Environments in Building Automation," article, Apr. 1997, IEEE.
Schneider, Stanley A., et al. "ControlShell: Component-Based Real-Time Programming," article, May 1995, IEEE.
Section 7, "LonWorks Programming Model" of Motorola LonWorks Technology Device Data, Rev. 3.1 published in 1997 by Motorola Corporation of Illinois.
Section 8, "LonTalk Protocol" of Motorola LonWorks Technology Device Data, Rev. 3.1 published in 1997 by Motorola Corporation of Illinois. Appendix A "Neuron Chip Data Structures," Motorola LonWorks Technology Device Data, Rev. 3.1 published in 1997 by Motorola Corporation of Illinois.
Apprendix B "Network Management and Diagnostic Services" of Motorola LonWorks Technology Device Data, Rev. 3.1 published in 1997 by Motorola Corporation of Illinois.
White Paper "Baja: A Java(tm)—based Architecture Standard for the Building Automation Industry," by Tridium(tm) 2000 (9 pgs. plus cover).
Gaw, David: "Accessing LonWorks Networks from the World Wide Web," 1996, pp. 1-25.
Kendall, John: "Object Oreiented Techniques for Lifecycle Modeling of Complex Control Systems," Abstract, pp. 4/1/4/7, 1994, IEEE.
Ghosh, Kalyan K. et al.: "Object Oriented Modeling and Simulation of Process Plants with Discrete Logic Controls," Abstract, phs. 416-425, 1995, IEEE.
Heino, Perttu et al.: "An Expert System in Process Design—Analysis of Process Safety and Reliability," Internationl Workshop on Artificial Intelligence for Industrial Application, 1988, pp. 225-231, IEEE.
Open Architecture Control Group, Working Specification "Open Architecture Control Initiative: JDC (Java for Distributed Control)," Jul. 1997, pp. 1-58.
Raji, Reza S.: "Control Networks and the Internet" Revision 2.0, @Echelon, 1998 pp. 1-13.
Kojima, Fumio et al.: "Enhanced Network Computing (ENC) Part 3. ENC Implemenation," Toshiba Corporation 1998 (14 pages).
Gaw, David: "Hosted Node Programming Tutorial: Employing a Hosted Node Solution," Coactive Aesthetics, Inc., 18 pages.
Kojima, Fumio "Enhanced Network Computing (ENC) Part 1. Outline of ENC Architecture," pp. 1-6, Toshiba Corporation.
Raji, Reza et al.: "LonWorks and the Internet: Extending the Reach," LonUsers International Conference presentation, May 1998, 11 pages.
Gaw, David: "Connecting LonWorks and TCP/IP Enterprise Networks—Real Application Successes," 1997, pp. 1-9, Coactive Aesthetics, Inc.
Yoshikazu Nakanishi, "Development of a Seamless Connection Technology Between Information Networks and Control Networks Using Java Language," Shikoku Research Institute Inc. (date of publication unknown).
Gaw, David et al.: "Requirements and System Architecture for Scalable, Integrated, Real-time Energy Management Systems," Coactive Networks, Inc., 1998, pp. 1-11.
Gaw, David: "LonWorks over the Internet: Technical Issues and Application," pp. 1-8, Coactive Aesthetics, Inc.
Andersen, Torben: "Use of LonWorks Technology for a High Level Building Security System. Advantages and Limitations," LonUsers Fall Conference 1997, 6 pages.
Niagara Framework, "A fully internet-enabled distributed infrastructure for real-time access, automation and control of embedded devices," 2000.
Vykon by Tridium, "Unlocking the Power of the 'Net for Anytime, Anywhere Control," (10 pages).
Denning, Adam: "ActiveX Controls Inside Out," 1997 Microsoft Press, 2nd Edition, pp. xiii-xv, 3-5, 19-23, 67, 439-441 and 445-446.

Nilsson, Brent: "Object-Oriented Chemical Process Modelling in Omola," Proceedings of the 1992 IEEE Symposium on CACSD, Mar. 1992, pp. 165-172.

Robinson, J.T. et al.: "An Intelligent Dynamic Simulation Environment: An Object-Oriented Approach," Proceesings of the 1988 IEEE Symposium on Intelligent Control, Aug. 24, 1988, pp. 687-692.

Kramer J. et al., "CONIC: an Integrated Approach to Distributed Computer Control Systems," IEE Proc., vol. 130 Pt. E, No. 1, Jan. 1983.

Diaz-Gonzalez, Jose P.; Urban, Joseph E., "Language Aspects of Envisager: An Object Oriented Environment for the Specification of Real-time Systems," 1988, IEEE.

Eliassen, F. et al.: "A Multilayered Operating System for Microcomputers," Microprocessing and Microprogramming 14 (Sep. 1984), No. 2, Amsterdam, Netherlands, pp. 45-54.

USENIX Association Summer Conference Proceedings, Atlanta 1986, Atlanta Georgia, Jun. 9-13, 1986, pp. 172-181; J.M. Bloom, et al.: "Experiences Implementing BIND, a Distributed Name Server for the DARPA Internet."

Sheltzer, Alan B. et al.: "Name Service Locality and Cache Design in a Distributed Operating System," Proceedings of the 6th International Conference on Distributed Computing Systems, Cambridge, Massachusetts, May 19-23, 1986, pp. 515-522, IEEE, New York, U.S.

Ammar, Mostafa H. et al.: Using Hint Tables to Locate Resources in Distributed Systems,: Proceedings of the Seventh Annual Joint Conference of the IEEE Computer and Communication Societies, IEEE Infocom '88, New Orleans, Louisiana, Mar. 27-31, 1988, pp. 1050-1059. IEEE New York, U.S.

"Embedded Internet Technology—Allegro Software Company Overview," Allegro Software, http://www.allegrosoft.com/company.html, Printed Jan. 29, 2004.

"U.S. Appl. No. 10/368,084, Non Final Office Action mailed Jul. 6, 2006", 9 pgs.

"U.S. Appl. No. 10/368,084, Notice of Allowance mailed Jan. 9, 2007", 7 pgs.

"U.S. Appl. No. 10/368,084, Response filed Sep. 29, 2006 to Non Final Office Action mailed Jun. 6, 2006", 13 pgs.

"Chinese Application Serial No. 03803852.8, Office Action mailed May 23, 2008", 6 pgs.

"European Application Serial No. 03742802.6, Supplementry European Search Report mailed Nov. 11, 2009", 3 pgs.

"International Application Serial No. PCT/US03/04804, International Search Report mailed Jun. 12, 2003", 1 pgs.

"Japanese Application Serial No. 2003570268, Office Action mailed Mar. 28, 2009", 4 pgs.

"Japanese Application Serial No. 2003570268, Office Action mailed Aug. 17, 2009", 11 pgs.

* cited by examiner

REAL-TIME DATA INTERFACE AND METHOD FOR BROWSERS AND THE LIKE

This patent application claims the benefit of priority under 35 U.S.C. 119(e) from U.S. Provisional Patent Application Ser. No. 60/357,329, filed Feb. 15, 2002, entitled "COMPONENT MODEL FOR REAL-TIME SYSTEM CONTROL", which is hereby incorporated by reference as if set forth in its entirety herein.

FIELD OF THE INVENTION

The present invention relates generally to user interfaces and more particularly to an extensible interface that draws in resources, as needed, for real-time presentation of data.

BACKGROUND OF THE INVENTION

Several technologies are available to assist in gathering and presenting data for display through a user interface. One technology is ActiveX of the Microsoft Corporation which provides a robust set of tools to assist in issuing data requests and in processing the requests for presentation on a display. A limitation of ActiveX technology is that it has a large footprint, that is, its memory requirement is not practical for all applications (e.g., for some wireless platforms such as cellular telephones and personal digital assistants ("PDA")). Another technology is Sun's Java engine but again, an interface that requires that engine has a large footprint and has a predetermined set of abilities as of the release date of the engine. There remains a need in the art for an open, extensible interface engine that has a small native footprint yet is capable of pulling in components, as needed, to suit a given application or platform. The present invention addresses these and other needs.

SUMMARY OF THE INVENTION

In one aspect, the present invention includes a method for providing a real-time data display and interface for a network device. In that method, a page is loaded in a browser configured for operation on the network device. The page includes an engine which is executed in the browser. The engine is used to automatically load a definition file from a remote source in response to content within the loaded page. One or more widgets (that is to say, displayed elements such as graphical objects) are instantiated for display in the interface, with each widget making data requests at intervals prescribed by parameters for each respective widget. These data requests are forwarded to one or more servers that are in communication with the network device, and the requested data is thereafter received and presented in the interface thereby providing the user with dynamically updated data.

In another aspect, the present invention includes an engine for providing a real-time data interface to a network device. The engine comprises executable code configured to instantiate one or more widgets for rendering within the display of the real-time data interface. The engine further includes a reference to a definition file which defines prescribed parameters for one or more of the widgets.

These and other aspects, features and advantages of the present invention can be further understood from the accompanying Drawing figures and description of a preferred embodiment.

BRIEF DESCRIPTION OF THE DRAWING FIGURES

DETAILED DESCRIPTION OF A PREFERRED EMBODIMENT

Figure 1:
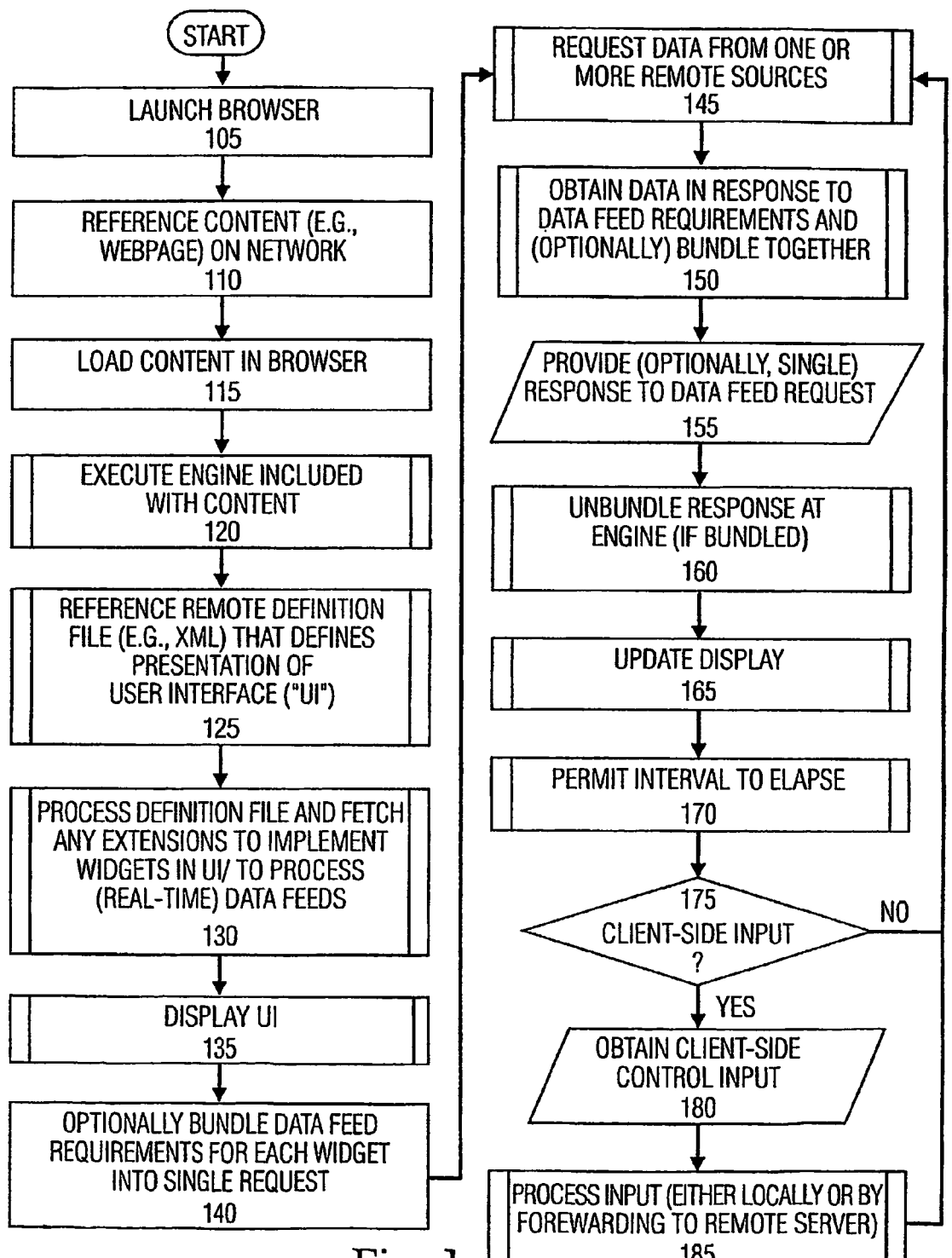
FIG. 1 is a flow diagram illustrating steps taken in accordance with a preferred method of the present invention.

By way of overview and introduction, the present invention concerns improvements in user interfaces, and more particularly, a lightweight and flexible software engine that permits visualization of real-time data feeds and other constantly changing information. The interface of the present invention is unique in combining portability, low use of resources, and flexibility to accommodate changing operational platforms on which the interface can be presented as well as the changing needs of developers and users. The particular platform that executes the user interface is sometimes referred to herein as the "network device." The interface of this invention allows the display of visual objects (called "widgets" herein), wherein each object can contain codes governing its own continuously changing behavior and the ability to interface with a user. In part, the interface is suitable for use with a component model as described in U.S. Patent Application Ser. No. 60/357,329, filed on even date herewith and entitled "Component Model for Real Time System Control," which is hereby incorporated by reference as if set forth in its entirety herein. Such a component model may be part of a building automation and control system having multiple servers operable to monitor systems and devices.

It is generally desirable to allow non-programmers to create their own thin-client user interfaces. By "thin client" we mean a user interface program, which can be displayed in an off-the-shelf web browser such as Internet Explorer or Netscape Navigator/Communicator. Since non-programmers build systems, it is important that these screens be easily created using high-level graphical programming tools without knowledge of programming, HTML, JavaScript, etc.

Among others, the types of screens that would be desirable to display in a browser include graphics, alarms, charts, reports, and properties. The graphical display of real-time status of system operation typically includes the display of current device status using pictorial representations. For example if a fan is on, then the graphic would display the fan blades rotating or air blowing. The display and management of system alarms includes the ability to view, query, sort, and filter alarms from multiple systems and perform various levels of acknowledgement. It is beneficial to provide charts such as pie charts, line graphics, and bar charts to visually illustrate any data that has been mined from the system being monitored or controlled. For example if the system is collecting historical data for outside air temperature and runtimes for a piece of equipment, it is valuable to see that historical data presented in one chart. Users should be able to generically query any data found within the system to build reports using text, tabular information, or charts. It is also desirable to be able to view and edit properties of any component in the system generically without the component developer having to manually create a special web user interface.

The solution of the present invention can be used in the Niagara component model as described in U.S. Patent Application Ser. No. 60/357,329, filed on even date herewith and entitled "Component Model for Real Time System Control," or in any other application. In the preferred embodiment, a Java applet called a Wisp applet is used to create the user interface; however, other compiled applications can be used. A Java applet is a small Java program, which is downloaded to a web browser to fill a piece of an HTML page. In our case the Wisp applet typically fills the entire HTML page.

Referring now to FIG. 1, use of an interface and method in accordance with a preferred embodiment is described. At step 105, a browser is launched on a supporting platform in a conventional manner. If the platform is a personal computer, then the browser can be, for example, the Internet Explorer browser made available by the Microsoft Corporation, or the Netscape Communicator browser of Netscape Communications Corporation. If the platform is some other electronic device such as a cellular telephone or PDA, then the browser that is launched can be a streamlined version of one of those browsers, or a different browser altogether.

At step 110, the user operating a given platform references content that is available on a network from a server to which the browser is in communication. Communications between the platform and other devices on the network are not part of the present invention; however, they maybe in any one of a variety of wired or wireless arrangements as is conventional in the art. Content is referenced, for example, by entering a web address in a location field of the browser, by selecting a destination from a pull down list, book mark, etc. The reference comprises the address of a particular file that is available on the network to which the platform is in communication (e.g. "www.tridium.com/main.htm"). Upon referencing a particular web page or other contents, communications are initiated across the network and the requested content is loaded into the browser, as indicated at step 115. Again, the browser can be a conventional HTML browser, or another browser that is optimized to operate on a given platform.

At step 120, an engine included within the loaded content, is executed. In one implementation, the engine comprises a java applet; however, the engine alternatively could be a plug-in, or other code located within the content. More specifically, the engine is preferably a small footprint segment of executable code (e.g., java code) that is configured to automatically reference various definitions that are necessary to implement a given user interface. In this way, the web page itself can be trivial in design and rely upon the engine to fill the screen, and engines provide different user interfaces by referencing different definition files.

As a result of executing the engine, a remote definition file is referenced at step 125, which defines a portion of the presentation of the user interface. The definition file includes the instructions necessary for the engine to build the desired display and is preferably an XML file and governs the lay-out, appearance, border, font color, and other parameters that influence the visual presentation of widgets within the interface, as well as the interaction of the widgets with sources of data that populate each widget's respective data fields with the dynamic real-time data. As well, the definition file can influence the placement and sizing of each widget relative to one another within the user interface.

Widgets are visual objects. They can represent software components or physical devices. They may comprise graphs, pie-charts or tables and they can be animated and provide information in a number of different ways. Widgets also can have the ability to interact with the user.

As an example, the definition file that is referenced at step 125 can be configured to draw into the browser one or more gif images of a fan as well as the code that causes rotation of the gifs to emulate the movement of fan blades on the screen.

Referencing of definition files is performed on the fly, that is, as the engine is executed. In this way, developers are not constrained to interface resources that are resident on the local browser, and users are not required to update their browsers in order to execute a given interface. Rather, the engine draws in passively and automatically the components and code necessary to implement the widgets that comprise a given user interface. These definition files can be sourced from a remote machine connected to the network, or can be resident locally on the platform. As a result of execution of the engine and references to the definition file, at step 130 the definition file is processed which causes any further extensions that may be necessary to implement a given widget to be fetched from a specified location, together with any code that is needed to process real-time data feeds for that widget. The code to implement the widgets is contained in the extensions, whereas the configuration for the widgets is preferably contained in the definition file. For instance, the code does not need to contain instructions as to whether a specific label of a widget is red or black—the definition file specified that.

As can be appreciated, the engine can be relatively small in size and therefore suitable for use on cellular phones and with network configurations that have security settings that prevent downloading large objects. Rather than providing a large native engine within the browser, the engine preferred embodiment is lightweight and able to render a table, chart, etc. in accordance with a given developer's requirements. The individual widgets are not predefined, but can be added by way of extensions that are fetched at step 130 on an as-needed basis. At step 135, the one or more widgets that comprise the interface are displayed on the platform's browser.

Each widget referenced in the definition file can be supplied with a data feed in accordance with its own specific configuration parameters. The configuration parameters define, among other things, the source for the data field, various protocol and handshaking parameters, and the ranges of the data to be supplied and displayed within a given widget. The data feed requirements are periodically sent out to one or more remote sources available on the network and data that is obtained is returned back to the user interface for display in the browser.

Optionally, the data feed requirements of multiple widgets are bundled together in an intelligent manner in order to minimize the number of requests issued out through the network. The bundled request is done in accordance with the configuration parameters for the given data feed (for example, in order to request data from multiple devices at the same interval). While there are advantages to bundling data feed requirements such as reducing network bandwidth usage, the method in accordance with the present invention can be operated without, that is, free of, the bundling step.

Regardless of whether data feed requirements are bundled at step 140, at step 145 a request for data from one or more remote sources is issued from the platform to a remote source. The data request can be marshaled through the engine, or each individual widget can issue its own data request. At step 150, data is obtained in response to the data feed requirements and, as noted above, can optionally be bundled together from a remote source for transmission back to the browser. Thus, as shown at step 155, a response is provided to the data feed request from the engine or a given widget, optionally as a single response. Of course, if the data comes from sources connected to different machines on the network, there would be no need to bundle all requests to a single response; the point here is that a minimized number of network data-feed requests can be issued through computer networks by aggregating those requests that are destined for the same server.

At step 160, responses to various data feed requests are unbundled at the software engine, assuming they were bundled in the first place. The engine notifies each widget on the page that new data is available, and widgets may change their presentation accordingly. Thereafter at step 165, the user interface display is updated. After a prescribed time interval or other interval, as indicated at step 170, a test is made at step 175 to see whether there was any input from the platform to the browser.

The type of inputs that can be provided via the user interface can vary greatly. The user interface can be a passive display of updated information from a remote source free of any input from the user. This may be appropriate in certain applications in which data is pushed to the user, such as applications in which stock prices and other financial data are being provided to a user. However, there are applications in which the user may wish to input data or an action through his browser to cause a change at a remote device. Such input can cause an action to be invoked on a remote server, for example, the purchase or sale of stock. As another example, the user might wish to change configuration parameters for a given widget (say, the range of information being displayed within a graph) or may wish to change the state of an object being monitored (such as the on/off state of a fan). Other inputs can include requests for new data feeds or requests for adding new gadgets to the user interface. The variety of input that can be made at the client's side is not limited to the foregoing examples, which are meant to merely illustrate the types of input that could be provided. If there has been no input at the client's side, then the process loops back to step 145 to request more data from remote sources in order to update the user interface display.

On the other hand, if there was an input at the client's side, the input is obtained at step 180 and is processed at step 185 either by forwarding the input to a remote server for handling, or handling locally if appropriate. Inputs can be from a human user or provided automatically in response to rules or other program that is executing or providing control-information to the particular platform on which the user interface is running.

The process continues as described above to request additional data from one or more remote sources in order to continuously update the display the user interface with real time data feeds.

The visualization system is designed to be compatible with popular software used for displaying third party content over standardized file formats, such as an HTML browser.

Figure 2:
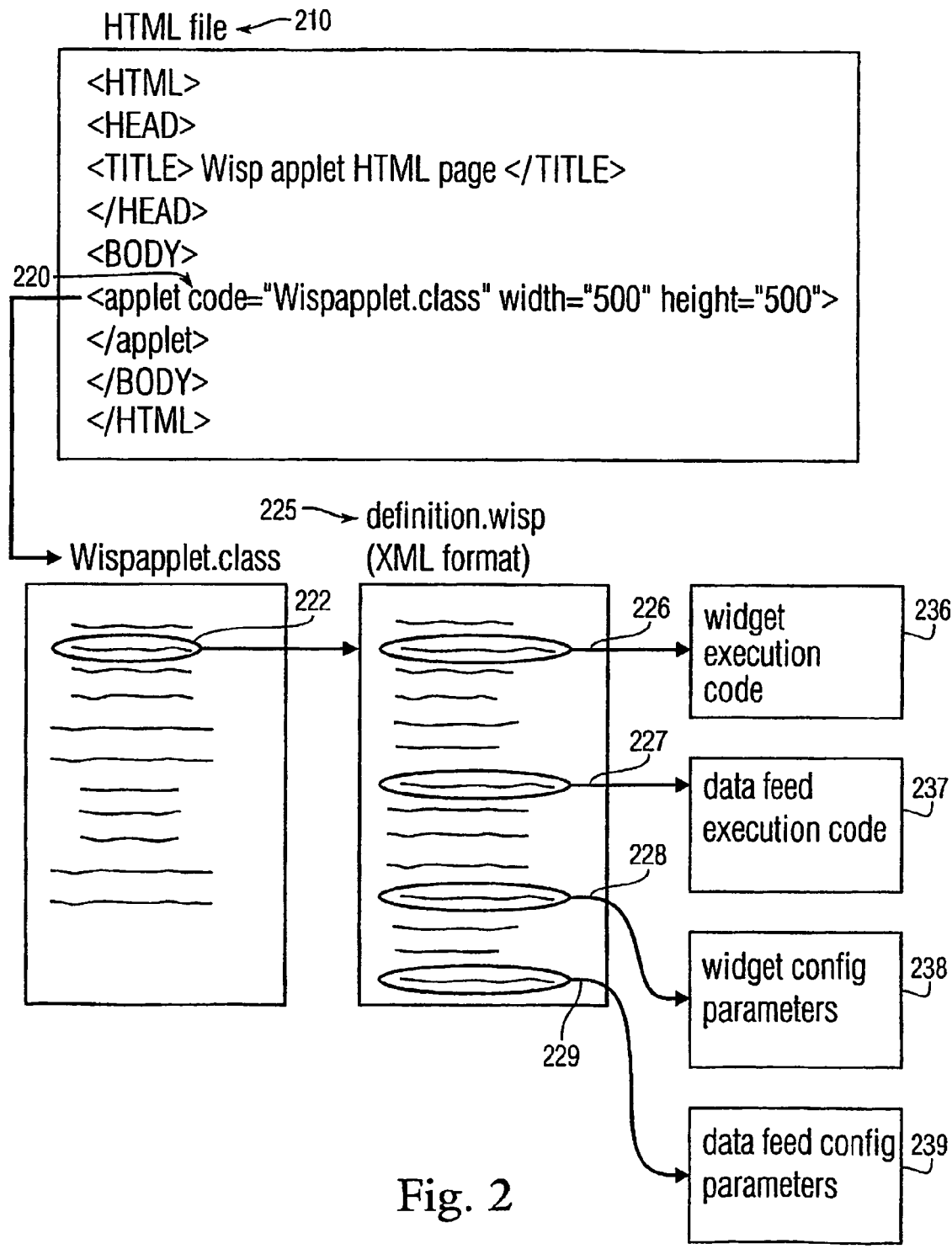
FIG. 2 illustrates, schematically, a hierarchy of files for implementing the methodology of the preferred embodiment.

Referring now to FIG. 2, the content that is referenced at step 110 can be the HTML file 210 which includes a plurality of tags as well as an applet entitled "Wispapplet.class" as the engine 220. Upon loading the HTML file 210 the applet tags are encountered and the applet is executed. Execution of the applet comprises executing a series of instructions included within the applet itself, and one of those instructions is a reference 222 to a remote definition file 225. The definition file can be an XML format or some other format, as noted above. The definition file defines the presentation of the user interface and, in turn, includes one or more references 226, 227, 228, 229 to respective extensions 236, 237, 238, 239. The extensions include code suitable for executing various widgets and data processes that are necessary to the operation of the user interface. More specifically, each widget in a user interface can have its own extension of code that may be necessary for driving that widget. On the other hand, the XML file itself may include sufficient information to execute the widget or the data feed. As well, the data feed execution codes that are referenced by the XML or other file provide code suitable for interacting with remote servers and devices in order to obtain data in the manner required by the user interface.

Figure 3:
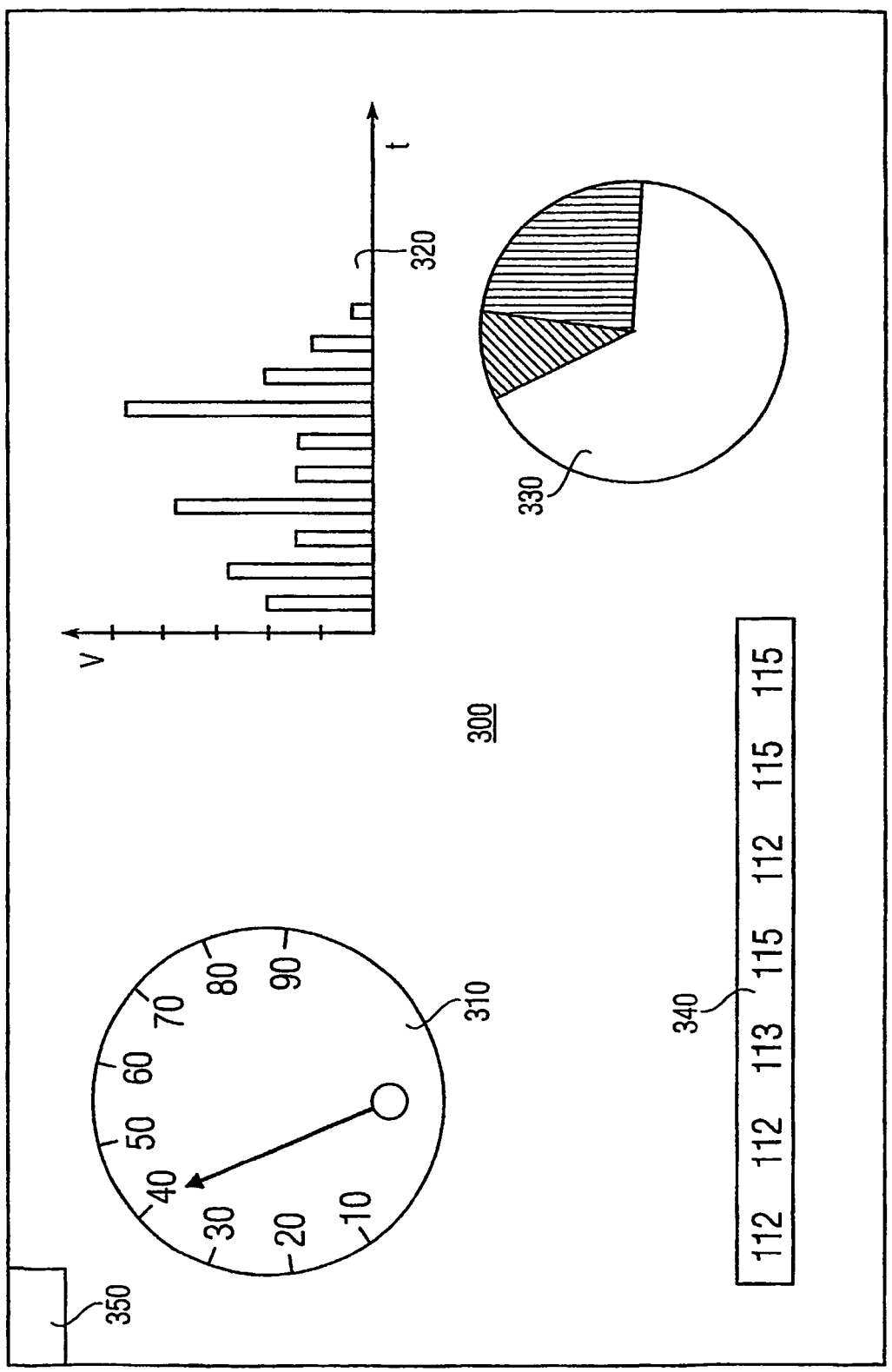
FIG. 3 is an illustrative display of several widgets that maybe displayed in a user interface constructed in accordance with the preferred embodiment.

Referring now to FIG. 3, a user interface 300 contains a variety of illustrative widgets. In this user interface, there is a visual representation of an analog gauge 310, a bargraph of voltage versus time 320, a pie chart 330 and a ticker 340. Of course, these are merely illustrative of some of the different types of devices that can be displayed within the user interface. As noted above, each of these widgets sends out data request to remote devices to populate their respective displays with real time information. In addition, the user can use an input device such as a mouse or other pointer to interact with one of these elements or with further control features such as a button 350 and the like in order to provide an input to perform any one of the functions described above in connection with steps 175-185 of FIG. 1.

There is some executable code associated with each widget, referenced in the definition file. This code is referred to as an extension. Extensions may be located on the user's computer or on another computer connected to the user's computer by a computer network. Extensions can be located by references included in the definition file. The engine parses the definition file and locates the extensions. The engine then loads the extensions, downloading them over a computer network, if necessary (step 104). The engine preferably executes in parallel all the extensions. Once the extensions are executing they display the user interface with the help of the engine. Each extension displays the widget it is associated with. The engine displays the general layout, described in the definition file, and it manipulates the displayed widgets in order to size and place them according to the definition file. The extensions may communicate with other software modules, and may change/update the widgets they are associated with according to these communications. The extensions may further interact with the user, by accepting and responding to commands by the user. The extensions may attempt to send or receive information from other software components based on interaction from the user. The widgets thus continuously update, based on the software code of the extensions, communications with other software modules, and/or interaction with the user. The extension may furthermore send control signals received from the user to other software modules.

An example of a Wisp HTML page:

```
<html> <body bgcolor='#c8c8c8'>
<applet name='Wisp' code='wisp.WispApplet'
    width='100%' height='100%'
    codebase='/' archive='wisp.har'>
    <param name='file' value='/homepage.wisp'>
</applet>
</body> </html>
```

The entire page can be a single applet deployed by a Java JAR file called wisp.jar. The wisp jar file doesn't actually contain any predefined screens but rather contains a software engine used to construct any screen on the fly. A parameter passed to the Wisp applet specifies a wisp file which contains the description of how to build the screen. This wisp file can be a simple XML file which contains the instructions for how and what to build. A simple example of what a wisp file looks like is as follows:

```
<wisp>
    <content type="EdgePane">
        <center type="Table" data="/go-get-table-data"/>
        <bottom type="Button" invoke="refresh()"/>
    </content>
</wisp>
```

The major advantage of this approach is that wisp files can be served off the file system or automatically generated using dynamic web technologies such as CGI, ASP, or Java Servlets. Only one small engine is sent to the client, which knows how to generically build any user interface from a wisp XML definition. The engine can be on the order of around 400 kilobytes in size, more or less within a few hundred thousand kilobytes, and in one implementation the engine is 150,000 bytes in size.

Thus, new user interface widgets can be plugged in by writing wisp extensions such as charts, alarm consoles, schedulers, etc.; a page may be partially re-loaded without requiring an entire refresh of the HTML page; and widgets may display a real-time data feed without requiring the page to be refreshed or reloaded. What makes these features possible is the fact that the wisp engine can maintain a persistent or polled connection back to the server. This connection may be used to refresh individual widgets in the page or to asynchronously receive events from the server. Standard HTML technology requires a refresh of the entire page, but since the Wisp engine is an applet it can selectively do these networking calls under the covers.

To take an example, imagine a wisp page, which displays two widgets. One is a graphical representation of a fan and another is an alarm console. The steps to load this page include:

1. The browser loads the HTML page which contains the Wisp applet with a parameter specifying which .wisp file to use;
2. The Wisp applet initializes itself then loads the specified .wisp file from the server;
3. The Wisp applet parses the XML to build the widgets specified; in our case this is afan graphic and the alarm console;
4. The Wisp applet opens a logical connection back to the server to get the current status of the fan and the current list of alarms. This information is used to initialize the fan and alarm console widgets;
5. The Wisp applet maintains a connection either through polling or with a persistent HTML connection to listen for events on either the fan or alarm console. If for example a new alarm is generated, it is automatically updated in the alarm console widget. If the fan turns on or off it is immediately reflected in the graphical presentation of the fan.

Since the Wisp architecture only requires that a simple XML file be created in order to build new screens it is extremely easy for developers to write CGI, ASP, or servlets to generate the Wisp XML on the fly. Likewise it is also very easy to create graphical programming tools to construct Wisp files without knowledge of the XML syntax.

Referring again to FIG. 3, the gauge 310 can represent a thermostat, which is controlled by a software module or a software component. The extension for the widget corresponding to the thermostat sends requests for updated temperature readings over a network with which the platform is in communication. The module controlling the thermostat answers those requests with data such as updates on temperature readings, operational state, associatiations with other devices, or device parameters. A user can interact with the widget through the interface 300, such as by clicking on the widget itself, for example, to change the scale from Celsius to Fahrenheit. The extension receives such an input (at step 180 of FIG. 1). The user can also send commands to the actual thermostat through the widget. For example, the user can switch the thermostat off (or devices associated with that thermostat), or put the thermostat and/or associated devices into a power saving mode. In this case, the widget forwards the command to the module controlling the thermostat.

Alternatively, the visual interface can better ensure efficient network communications by minimizing the number of open communication channels between the interface and one or more remote servers. Because multiple network communication channels operating in parallel can cause performance problems, the requests from individual widgets out to the network can be channeled through and managed by the engine 210. The engine can aggregate network communication requests over predefined periods of time and combine them as appropriate into bundles of larger size for transmission over the network, thus improving network efficiency. As noted in connection with the process of FIG. 1, only communications destined for the same network address or root server can be bundled. Bundling requires an associated software module at the receiving end to unbundle the communications. The engine 210 may also receive bundles from certain remote software modules which contain data concerning more than one widget in the interface 300. Such bundles are unbundled and provided to the extensions (that is, to the particular widget's code) that made the initial data request.

The visual interface system has been described using languages, formats and protocols, such as HTML, Java, XML, for the purpose of concreteness and clarity. The visual interface system is not limited to these languages, formats and protocols. The visual interface system may be configured to operate with any language that allows embedded applications. Any data file format, including proprietary data formats may be used instead of XML for the definition file.

The present invention has been described in connection with an exemplary embodiment thereof, but is limited only with respect to the recitations in any claims that follow.

We claim:

1. A method for providing a real-time data display interface for a network device in communication with a building automation and control system, the method comprising:
loading a page in a browser configured for operation on the network device, the loaded page including an engine;
executing the engine in the browser;
using the engine to automatically load a definition file from a remote source in response to content within the loaded page;
instantiating a plurality of widgets in the interface and displaying them therein, each widget making data requests;
directing the data requests from each respective widget to the engine, wherein a first set of the plurality of widgets requests data for building control devices coupled to a first server of a building automation and control system and wherein a second set of the plurality of widgets requests data for building control devices coupled to a second server of the building automation and control system;

bundling by the engine the data requests from the first set of the plurality of widgets received during a predetermined interval into a first bundled request and bundling by the engine the data requests from the second set of the plurality of widgets received during the predetermined interval into a second bundled request;

forwarding by the engine the first bundled request to the first server and the second bundled request to the second server;

receiving the requested data in response to the first bundled request and the second bundled request; and updating the interface with the received data;

wherein the definition file includes extensions to further code suitable for at least one of: rendering the plurality of widgets, requesting data for the plurality of widgets to display within the interface and receiving data for the plurality of widgets to display in the interface.

2. The method of claim 1, including the additional steps of:
loading one or more software programs each being associated with the one or more widgets in response to the instantiating step; and
executing the software programs.

3. The method of claim 1, including the additional step of repeating the forwarding, receiving and updating steps at intervals prescribed by respective widgets in the interface.

4. The method of claim 1, including the additional step of directing data requests from at least one of the widgets directly to a particular server in communication with the network device.

5. The method of claim 1, wherein the forwarding and receiving steps are performed over a wireless communication link.

6. The method of claim 1, including the additional steps of:
testing for inputs provided through the interface at the network device; and
processing the inputs at one of the network device and the remote source.

7. The method of claim 6, wherein the input provided through the interface influences the appearance of the data displayed in the one or more widgets.

8. The method of claim 6, wherein the inputs are provided by a human user.

9. The method of claim 6, wherein the inputs are provided programmatically by the network device itself.

10. The method of claim 1, wherein the page loaded in the browser is a web page.

11. The method of claim 10, wherein the web page includes a body portion that consists essentially of the engine.

12. The method of claim 1, wherein each widget is generated dynamically in response to the definition file at the remote source.

13. The method of claim 1, wherein the engine is on the order of about 400 Kilobytes in size.

14. The method of claim 1, wherein updating the interface with the received data includes updating the interface independently of updating the page in the browser.

15. An apparatus for providing a real-time data display interface for a network device in communication with a building automation and control system, the apparatus comprising:
a processor and a memory;
a browser executable by the processor and memory and operable to download a page in prescribed format, wherein the page includes an engine executable by the processor and executable code to instantiate a plurality of widgets for rendering within the real-time data display interface;
a reference to a definition file which defines prescribed parameters for the plurality of widgets; and
a first server coupled to building control devices and a second server coupled to building control devices, the first server and second server further coupled to the building automation and control system;
wherein the plurality of widgets are operable to direct data requests to the engine, the data requests including requests by a first set of the plurality of widgets for data from building control devices coupled to the first server and requests by a second set of the plurality of widgets for data from building control devices coupled to the second server, and wherein the engine is operable to:
bundle the data requests from the first set of the plurality of widgets received during a predetermined interval into a first bundled request and bundle the data requests from the second set of the plurality of widgets received during the predetermined interval into a second bundled request,
forward the first bundled request to the first server and the second bundled request to the second server,
receive the requested data in response to the first bundled request and the second bundled request, and
update the interface with the received data; and
wherein the definition file includes extensions to further code suitable for at least one of: rendering the plurality of widgets, requesting data for the plurality of widgets to display within the interface and receiving data for the plurality of widgets to display in the interface.

16. The apparatus of claim 15, wherein the page is in an HTML format.

17. The apparatus of claim 15, wherein the definition file is located at a source remote from the network device.

18. A computer-readable storage medium having computer executable instructions stored thereon that when executed by one or more processors perform a method for providing a real-time data display interface for a network device in communication with a building automation and control system, the method comprising:
loading a page in a browser configured for operation on the network device, the loaded page including an engine;
executing the engine in the browser;
using the engine to automatically load a definition file from a remote source in response to content within the loaded page;
instantiating a plurality of widgets in the interface and displaying them therein, each widget making data requests;
directing the data requests from each respective widget to the engine, wherein a first set of the plurality of widgets requests data for building control devices coupled to a first server of the building automation and control system and wherein a second set of the plurality of widgets requests data for building control devices coupled to a second server of the building automation and control system;
bundling by the engine the data requests from the first set of the plurality of widgets received during a predetermined interval into a first bundled request and bundling by the engine the data requests from the second set of the plurality of widgets received during the predetermined interval into a second bundled request;

forwarding by the engine the first bundled request to the first server and the second bundled request to the second server;

receiving the requested data in response to the first bundled request and the second bundled request; and updating the interface with the received data;

wherein the definition file includes extensions to further code suitable for at least one of: rendering the plurality of widgets, requesting data for the plurality of widgets to display within the interface and receiving data for the plurality of widgets to display in the interface.

19. The computer-readable medium of claim 18, wherein updating the interface with the received data includes updating the interface independently of updating the page in the browser.

* * * * *